(12) United States Patent
Henderson et al.

(10) Patent No.: US 9,170,639 B2
(45) Date of Patent: *Oct. 27, 2015

(54) METHOD AND APPARATUS FOR MITIGATING EFFECTS OF MEMORY SCRUB OPERATIONS ON IDLE TIME POWER SAVINGS MODES

(71) Applicant: International Business Machines Corporation, Armonk, NY (US)

(72) Inventors: Joab D. Henderson, Pflugerville, TX (US); Richard Nicholas, Round Rock, TX (US); Stephen J. Powell, Austin, TX (US); Kenneth L. Wright, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/859,101

(22) Filed: Apr. 9, 2013

(65) Prior Publication Data

US 2014/0304537 A1    Oct. 9, 2014

(51) Int. Cl.
*G06F 1/32* (2006.01)
*G06F 11/07* (2006.01)

(52) U.S. Cl.
CPC ............ *G06F 1/3275* (2013.01); *G06F 11/073* (2013.01)

(58) Field of Classification Search
CPC ............................ G06F 1/3275; G06F 11/073
See application file for complete search history.

(56) References Cited

U.S. PATENT DOCUMENTS

| | | | |
|---|---|---|---|
| 6,292,869 B1 * | 9/2001 | Gerchman et al. | 711/106 |
| 6,510,528 B1 * | 1/2003 | Freeman et al. | 714/6.1 |
| 7,821,864 B2 * | 10/2010 | Totolos et al. | 365/227 |
| 2007/0079185 A1 | 4/2007 | Totolos, Jr. | |
| 2007/0101238 A1 | 5/2007 | Resnick et al. | |
| 2007/0283178 A1 | 12/2007 | Dodeja et al. | |
| 2008/0043562 A1 | 2/2008 | Totolos et al. | |
| 2009/0172496 A1 | 7/2009 | Roine | |
| 2010/0191997 A1 | 7/2010 | Dodeja et al. | |
| 2012/0246544 A1 | 9/2012 | Resnick et al. | |
| 2013/0191833 A1 * | 7/2013 | Kotzur et al. | 718/102 |
| 2014/0304566 A1 | 10/2014 | Henderson et al. | |

\* cited by examiner

*Primary Examiner* — Stefan Stoynov
(74) *Attorney, Agent, or Firm* — Steven L. Bennett; Arnold B. Bangali (57) ABSTRACT

An approach for saving power in a memory subsystem that uses memory access idle timer to enable low power mode and memory scrub operation within computing system has been provided. The computing system determines that a memory subsystem is switched out of low power operation mode due to a memory scrub operation. In addition, the computing system bypasses the low power operation mode of an idle timer of the memory subsystem such that the memory subsystem is returned to the low power operation mode upon completion of the memory scrub operation. The computing system further sets a scrub flag of the memory subsystem to a high state, and clears the scrub flag to a low state to track if the idle timer should be bypassed.

12 Claims, 5 Drawing Sheets

METHOD AND APPARATUS FOR MITIGATING EFFECTS OF MEMORY SCRUB OPERATIONS ON IDLE TIME POWER SAVINGS MODES

FIELD OF THE INVENTION

The present invention relates generally to memory controllers of computing systems, and more particularly to mitigation of memory scrub operations of the memory controller on idle time power savings modes.

BACKGROUND

Memory controllers manage flow of data going to and from main memory of computing systems. Memory controllers can also be separate processors or integrated into other processors, such as, for example, on a silicon die of a microprocessor of the computing system. However, main memory, being constructed at smaller scales and higher densities than standard gates, can be vulnerable to errors developed in the data that is managed by the memory controllers.

For instance, errors in main memory can be due to variations in the physical structure of the semiconductors from which the memory is constructed, or for example, due to an external influence such as temperature variation or incident ionizing radiation. In addition, due to the vulnerability of errors in the memory, error correcting codes (ECC) can be stored in conjunction with stored data values of data managed by the memory controllers, hence, providing a level of redundancy which allows isolated errors in the memory data to be corrected. Moreover, computing systems platforms, including, for example, IBM® Power Systems® (IBM and power systems are trademarks of the International Business Machines in the United States other countries or both) architectures can proactively attempt to address memory errors by utilizing memory scrubbing operations. Memory scrubbing involves reading of contents of the memory through ECC logic, and correcting any errors of the memory controllers that have been accumulated in the computing system. Correctable errors are usually single-bit or double-bit errors within a cacheline but some ECC codes allow for up to 8 bits in error within a single byte.

SUMMARY

In one embodiment, a method is provided for saving power in a memory subsystem that uses a memory access idle timer to enable low power mode and memory scrub operation of a memory scrub engine within the memory subsystem of a computing system. The method comprises a computing system determining that a memory subsystem is switched out of low power operation mode due to a memory scrub operation. The method further comprises the computing system bypassing the low power operation mode of an idle timer of the memory subsystem such that the memory subsystem is returned to the low power operation mode upon completion of the memory scrub operation, wherein the computing system sets a scrub flag of the memory subsystem to a high state if the memory subsystem is in low power operation mode and the memory subsystem performs the memory scrub operation, and wherein the computing system clears the scrub flag to a low state if the memory subsystem performs an operation that is not a memory scrub operation.

In another embodiment, a computer system is provided for declaring a content object to a records management server with a mobile device. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to determine that a memory subsystem is switched out of low power operation mode due to a memory scrub operation. The computer system further comprises program instructions to bypass the low power operation mode of an idle timer of the memory subsystem such that the memory subsystem is returned to the low power operation mode upon completion of the memory scrub operation, wherein the computing system includes program instructions to set a scrub flag of the memory subsystem to a high state if the memory subsystem is in low power operation mode and the memory subsystem performs the memory scrub operation, and wherein the computing system includes program instructions to clear the scrub flag to a low state if the memory subsystem performs an operation that is not the memory scrub operation.

In yet another embodiment, a computer program product is provided for declaring a content object to a records management server with a mobile device. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further comprises further comprises program instructions to determine that a memory subsystem is switched out of low power operation mode due to a memory scrub operation. The computer program product further comprises program instructions to bypass the low power operation mode of an idle timer of the memory subsystem such that the memory subsystem is returned to the low power operation mode upon completion of the memory scrub operation, wherein the computing system includes program instructions to set a scrub flag of the memory subsystem to a state if the memory subsystem is in low power operation mode and the memory subsystem performs the memory scrub operation, and wherein the computing system includes program instructions to clear the scrub flag to a low state if the memory subsystem performs an operation that is not the memory scrub operation.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying figures, wherein, like reference numerals indicate like components, and:

DETAILED DESCRIPTION

Exemplary embodiments of the present invention includes circuits or subassemblies well as methods of operation, adapted to mitigate the effects of memory scrub operations on idle time power savings modes of the memory controllers. Memory controllers of computing systems have two features that can conflict during operation of the computing system: background scrub and low power operation mode. In one aspect of the present invention, background scrub, also commonly known as memory scrub, is a reliability, availability, and serviceability (RAS) main memory mitigation feature of memory controllers. The background scrubbing feature includes a memory scrubbing circuit or scrub engine that operates in the background operation of the memory controllers to mitigate correctable errors (CEs) of the memory controllers before the CEs become uncorrectable errors (UEs). In particular, if the memory scrubbing circuit identifies a CE, it corrects and removes the error, as described in further details below. The scrub engine reads a cacheline at a time at a rate that typically covers all of the memory behind the memory controller in a 12 to 24 hour period.

Furthermore, due to significant amount of dual inline memory modules (dimms) required by main memory of computing systems, main memory can consume large amounts of power to operate in the computing systems. The memory dimms include a series of dynamic random-access memory integrated circuits of the computing systems. Further, memory can include different levels of parameters of power modes, including, low power (LP) mode, rank power down, or self time refresh that main memory can operate within. LP mode significantly reduces power in dimms and buffer chips or processors of the computing systems. Entering or exiting LP mode can adversely affect the performance of the computing system. Therefore, LP mode is typically entered only when it is likely that the computing system will be in idle for a significant amount of time in the context of computer operation. For example, the memory controller of the computing system would typically not enter LP mode immediately when its memory queue goes idle because any memory operation that needs to run while the memory subsystem is in LP mode, has to wait significant amount of time (for example 1 us) for the microcontroller to exit LP mode before it can begin operation. Therefore, memory controllers attempt to put the memory subsystem in LP mode only when they are reasonably sure that the memory controller queue will be idle for a significant period of time. The memory controller typically determines this via an Idle Timer which makes sure the queue is idle for a decent amount of time (for example 20 us) before deciding that the queue is truly idle. The idle timer usually avoids mistaking brief temporary idle conditions that happen frequently with a real prolonged period of idle that can be safely put into Low Power mode thereby achieving power savings without negatively impacting performance. The background scrubbing feature of the memory controller can adversely affect power consumption of memory subsystem during idle time operation of the memory controller because the background scrubbing mechanism utilizes memory dimms and buffer chips which must be taken out of low power mode just to perform the scrub operation.

For instance, a computing system which is idle based on processor workload can still periodically conduct background scrubbing operations of memory controllers to meet the a predetermined requirement of memory scrubbing, for example, every twelve hours of operation of the computing system. However, when background scrub operations are conducted during idle mode of the computing system, the background scrub forces memory to exit LP mode in order to perform the scrub operation, and waits for the idle timer in the memory controller to expire before allowing the memory to re-enter LP mode.

Furthermore, because the intent of the idle timer of memory of the computing system is to confirm that the computing system is really idle and has not just gone into some momentary cache contained loops, applying the idle timer of the computing system to background scrub operations defeats the purpose of the idle timer, and can keep the computing system out of LP mode for long periods of time unnecessarily. Therefore, the background scrub feature of the computing system can cause unnecessary power consumption of the computing system when the computing system is idle during the background scrub operation which could cause the product to fail power efficiency standards, including, for example, Energy Star program that enhances energy efficiency for businesses and individuals.

Embodiments of the present invention are further adapted to allow the computing system to bypass usage of the LP mode idle timer when the only reason the computing system transitioned to non-idle mode was to perform background scrubbing of memory of the computing system. In one embodiment of the invention, the memory controller of memory maintains a flag called "SFlag" (i.e. a scrubbing flag, etc.) that it clears (e.g. sets to zero) every time a new non-scrub operation is put into memory operations queue of the computing system. If the SFlag is already clear when a new non-scrub operation is put into queue, it remains clear.

The memory controller sets the SFlag (e.g. sets to one) when it has to exit LP mode because a scrub operation is queued. Furthermore, whenever, the queue goes idle, the memory controller skips the LP mode idle timer if the SFlag is set. This has the effect of skipping the idle timer if the memory controller had exited low power mode for scrub and no other non-scrub operations arrived before re-entry into LP mode. If the SFlag is clear when the queue goes idle, the memory controller will start the idle timer and wait for its expiration before it enters LP mode as it always has.

Figure 1:
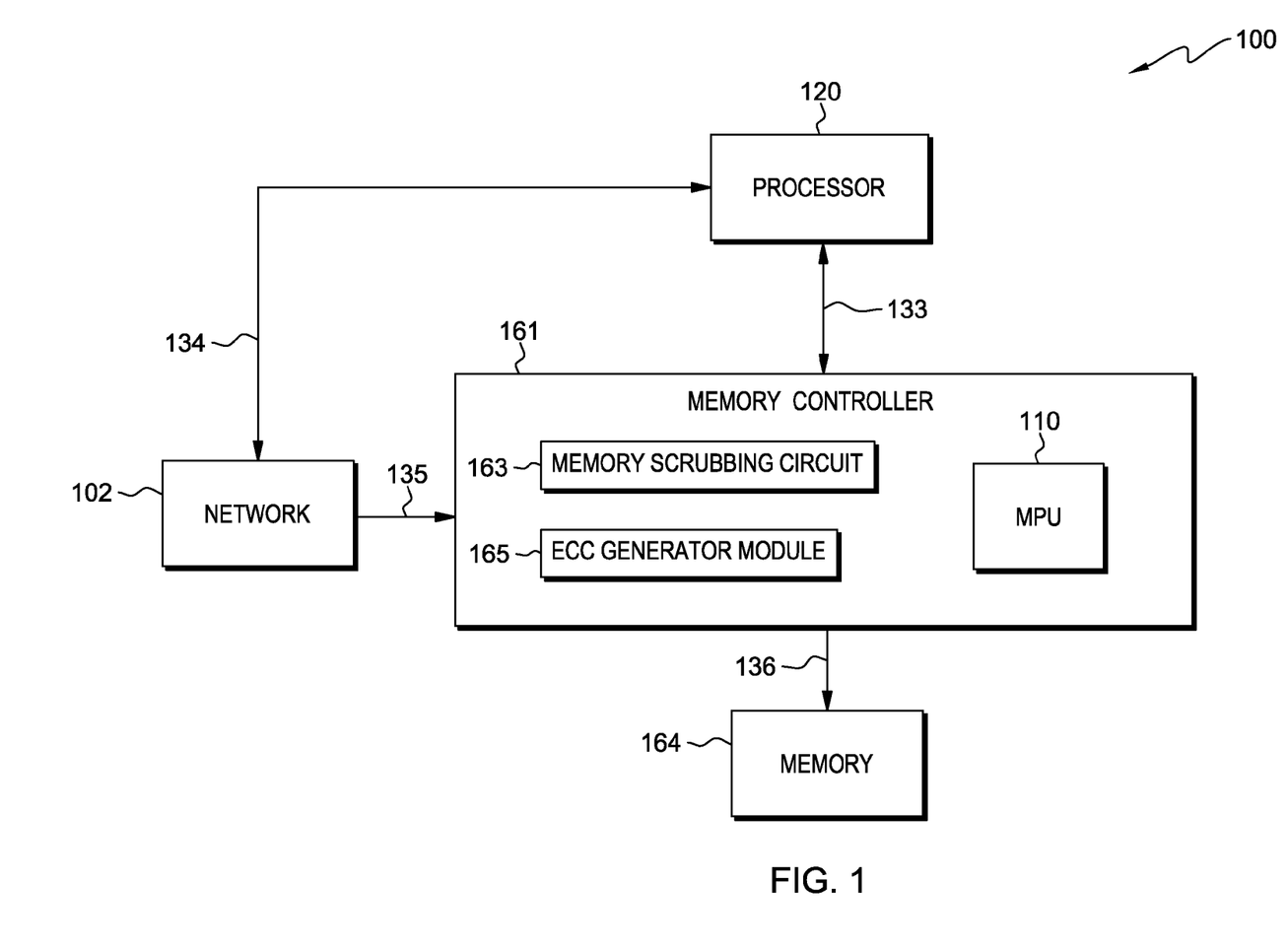
FIG. 1 is a functional block diagram of a computing system in accordance with embodiments of the present invention.

Embodiments of the present invention will now be described in detail with reference to the accompanying drawings. Referring now to FIG. 1, a computing system 100 for detecting power saving idle time during memory scrubbing operations of a memory controller of computing system 100 is shown. Computing system 100 can be a server computing system, including, for example, a web server computing system. The web server computing system can also represent a "cloud" of computers interconnected by one or more networks where power saving idle time of the memory controller can be mitigated during memory scrubbing operations.

Computing system 100 can also be a desktop computer, a laptop computer, a notebook computer, or a system or processor. Computing system 100 includes processor 120, network 102, memory controller 161 and memory 164. Further, memory controller 161 includes memory scrubbing circuit 163, ECC generator module 165 and MPU 110.

According to one embodiment of the present invention, MPU 110 monitors operating parameters of computing system 100 to mitigate memory power utilization during memory scrubbing events of memory controller 161. Furthermore, memory controller 161 is coupled to one or more operating elements of computing system 100 via one or more communication links, including, for example, links 133, 134, 135, and 136.

Processor 120 is the central processing unit of computing system 100 that controls, monitors, and detects overall operation of computing system 100. Processor 120 executes software of processing elements, including, for example one or more programmable general purpose or special-purpose microprocessors, digital signal processors (DSPs), programmable controllers, application specific integrated circuits (ASICs), programmable logic devices (PLDs), or the like, or combination of such devices. Network 102 includes one or more networks of any kind that can provide communication links between various devices and computers connected together within computer system 100.

Network 102 can also include connections, such as wired communication links, wireless communication links, or fiber optic cables. Network 102 can be implemented as a number of different types of networks, including, for example, a local area network (LAN), wide area network (WAN) or a packet switched telephone network (PSTN), or some other networked system. Memory 164 is the main memory of computing system 100. Memory 164 represents any form of random access memory (RAM), and read-only memory (ROM), flash memory, or the like, or a combination of such devices. For instance, memory controller 161 can be integrated with processor 120, wherein memory controller 161 can be a serve as an integrated memory controller for processor 120.

Memory scrubbing circuit 163 requests a read of data stored at addresses of memory 164 to identify or detect errors in the data read. According to embodiments of the present invention, memory 164 is scrubbed for bit errors by memory scrubbing circuit 163, wherein memory scrubbing circuit 163 requests reads of data stored in memory 164 from memory controller device 161. For instance, memory scrubbing circuit 163 requests reads of data stored in memory 164 so that single bit errors and multiple-bit errors can be identified or detected in the data stored, from the reads of data. Furthermore, memory scrubbing circuit 163 requests reads of data stored in memory 164 to detect and correct single bit errors, before those single bit errors accumulate into double or multiple-bit errors. For example, one single bit error in a data word may be a single-bit error that can be corrected by a correction algorithm. However, if another single-bit error develops in the data word, the data word now has a double-bit error, which may not be correctable. In this manner, it is desirable to scrub data words of memory to correct single-bit errors before they become or accumulate into double bit errors. When data is inserted or written to memory, ECC generator module 165 may keep or generate one, two or more bits of data for each byte stored in memory 164 as an error correction code (ECC) for that byte. Keeping or generating the code may be according to an algorithm implemented in ECC generator module 165 by hardware, software, logic, processors, etc. In one aspect, the correction code from ECC generator module 165 may be stored in memory 164, such as by being stored in memory 164 with the bytes of data corresponding to the code.

For instance, one or more bits may be appended to one end of the data byte they correspond to, and the appended byte may then be stored in memory. Therefore, when data is read from memory, each byte of the read data may be compared with error correction code stored in memory, to ensure that there are no errors in the bits of the byte. For example, error correction code from ECC generator module 165 may be stored in memory. In this manner, the more bits kept per byte in an ECC code (e.g., stored in memory with the corresponding byte), the more accurate error detection can be and the more error bits that can be corrected for a single data read or byte. Therefore, identified errors of memory may be corrected or scrubbed, for example, by memory scrubbing circuit 163, which includes a correction circuit and/or logic to implement single-bit error correction to correct a single-bit error identified in memory.

Figure 2:
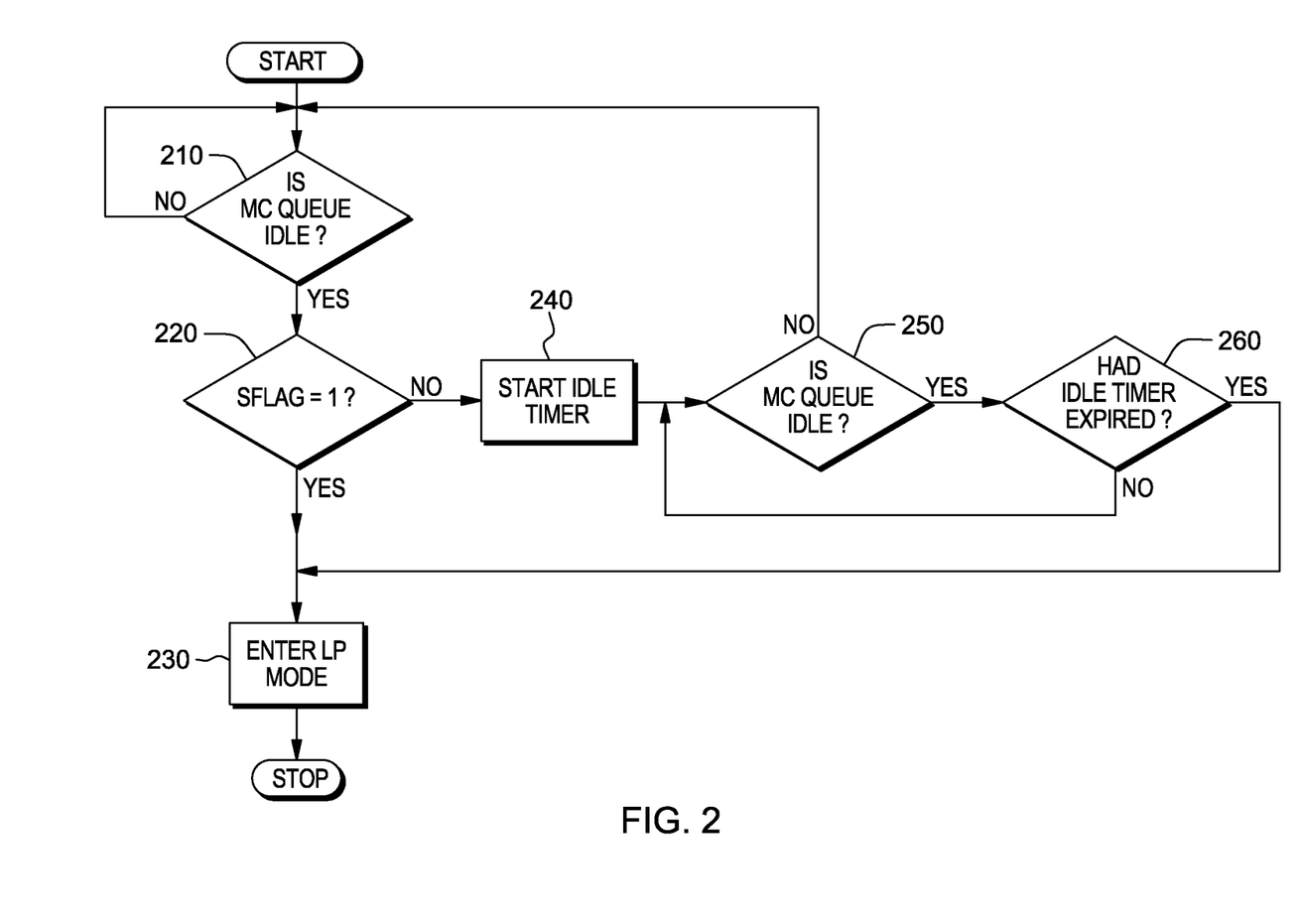
FIG. 2 is a flowchart depicting steps performed by a memory controller of a computing system to monitor idle time of the memory controller in accordance with embodiments of the present invention.

FIG. 2 is a flowchart depicting steps performed by memory controller 161 to monitor idle time of memory controller 161 before entering low power mode of computing system 100.

At start, memory controller 161 detects program operations in a queue of memory controller 161. At decision 210, if there are program operations in the queue of memory controller 161, memory controller 161 is not idle, hence, memory controller 161 continues to monitor when memory controller 161 is idle at start. However, if there are no program operations in the queue of memory controller 161, memory controller 161 is idle. In this manner, at decision 220, memory controller 161 determines that scrub flag of memory scrubbing circuit 163 is set to high state or 1. If memory controller 161 determines that scrub flag of memory controller 161 is set to 1, memory controller 161 immediately bypasses idle timer process of computing system 100 and enters low power mode (LP mode). (Step 230).

However, if memory controller 161 determines that the memory scrub flag is set to low state, memory controller 161 starts idle timer process. (Step 240). For instance, according to at least one embodiment, whenever, memory controller 161 goes idle, memory controller 161 bypasses low power mode if the scrub flag is set to 1 or high state. This has the effect of skipping the idle timer process if memory controller 161 exits low power mode for background scrub operations of memory scrubbing circuit 163, and wherein no other program operations arrived in memory controller 161 before memory controller 161 re-enters low power mode after the scrub operation, as described above.

For instance, if memory controller 161 detects that the memory queue is idle, idle timer of memory controller 161 measures how long memory controller 161 has been idle, and also when memory controller will enter low power mode after the idle timer determines that memory controller has been idle for a certain threshold amount of time. However, according to at least one embodiment, when memory controller 161 is idle, memory controller 161 skips or bypasses the idle timer process of determining a threshold amount of time that memory controller 161 is idle based on the value of the scrub flag.

As described, at step 240, the idle timer of memory controller 161 is initiated if the scrub flag is 0 or low state. Hence, memory scrubbing circuit 163 is not performing memory scrub operations on computing system 100. In particular, the idle timer determines idle time of memory controller 161, and waits, typically, tens of microseconds of idle time before allowing microcontroller to enter low power mode. At decision 250, memory controller 161 detects if the memory queue is idle during the idle timer process. If the queue is not idle during the idle timer process, memory controller 161 returns to the start and performs non-idle tasks, and then returns to step 210. If microcontroller is idle during the idle timer process, then at decision 260, memory controller 161 detects if idle time of about tens of microseconds has expired. If idle time has expired, memory controller enters low power mode at step 230. However, if idle time has not expired, memory controller 161 continues to detect if the memory queue is idle.

Figure 3:
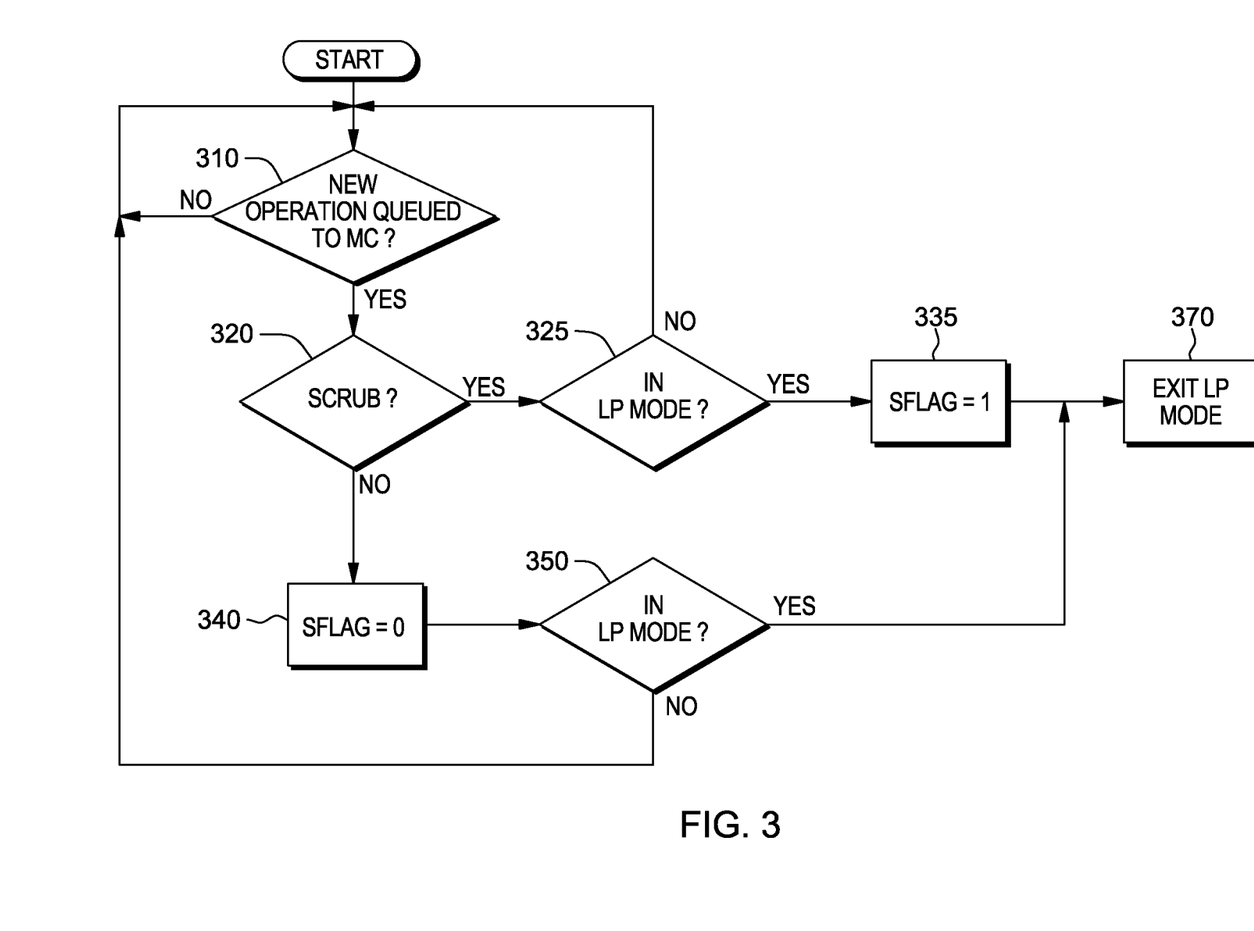
FIG. 3 is a flowchart depicting steps performed by a memory controller of memory of a computing system to exit low power operation mode in accordance with embodiments of the present invention.

FIG. 3 is a flowchart depicting steps performed by memory controller 161 to exit low power mode when scrub flag of memory scrubbing circuit 163 is set to high or cleared to low state. The scrub flag of memory scrubbing circuit 163 is a latch or flip flop that holds a value which is either high (1) or low (0). Clearing the scrub flag means setting the scrub flag to low. For instance, if a new operation enters memory controller 161, and the new operation is not a scrub read of memory scrubbing circuit 163, the scrub flag is cleared in memory controller 161 meaning the scrub flag is set to low. Furthermore, if the scrub flag is already cleared or low when the non scrub operation enters memory controller 161, it remains low or clear.

Memory controller 161 sets the scrub flag to high when memory controller 161 has to exit low power operation mode because a scrub operation is performed by scrub engine of the memory scrubbing circuit 163. At decision 310, memory controller 161 detects if a new program operation is queued to memory controller 161. If a new program operation is not queued to memory controller 161, memory controller 161 continues to detect if a new program operation is queued to memory controller 161.

However, if a new program operation is queued to memory controller 161, at decision 320, memory controller 162 detects if the new program operation is a scrub operation by memory scrubbing circuit 163. If the new operation is not a scrub operation, at step 340, memory controller 161 sets the scrub flag to low.

At decision 350, memory controller 162 detects if the new non scrub operation of memory scrubbing circuit 163 arrives when the memory subsystem is in low power operation mode. If the new non scrub operation is not in low power operation mode, memory controller 162 continues to monitor the memory queue for new operations queued to memory controller 161. However, if the new non scrub operation does arrive in low power mode, at step 370, memory controller 161 exits low power mode. Furthermore, if the new operation at decision 320, is a scrub operation, at decision 325, memory controller 161 detects if the memory subsystem is in low power operation mode. If the new operation is a scrub operation by memory scrubbing circuit 163, and the memory subsystem is in low power mode, at step 335, memory controller 161 sets the scrub flag to high or 1. In this manner, at step 370, memory controller 161 exits low power operation mode. For instance, memory controller 162 still considers the memory queue as being idle if the only reason microcontroller exited low power operation mode was to do a scrub read.

Figure 4:
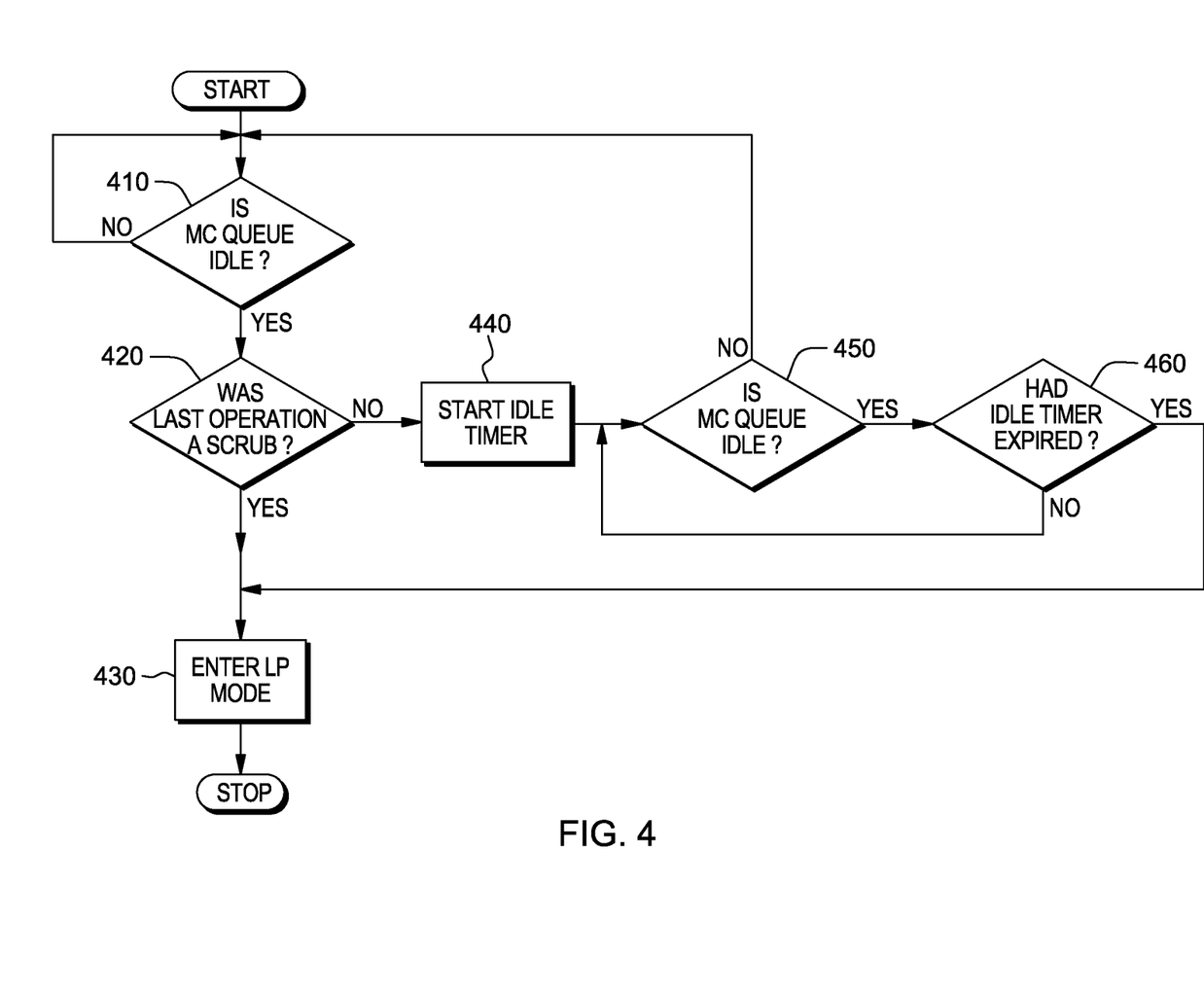
FIG. 4 is a flowchart depicting steps of an alternative embodiment performed by a memory controller of a computing system to monitor idle time of the memory controller in accordance with embodiments of the present invention.

FIG. 4 is a flowchart depicting steps of an alternative embodiment performed memory controller 161 to monitor idle time of memory controller 161 before entering low power mode. Memory controller 161 detects program operations in the queue locations of memory controller 161. At decision 410, memory controller 162 detects if the memory queue is idle.

If memory controller 161 is not idle, memory controller 162 continues to detect if the memory queue is idle. However, if the memory queue is idle, at decision 420, memory controller 161 detects whether the last operation of memory controller 161 was a scrub operation by memory scrubbing circuit 163. If last operation was a scrub operation, then at step 430, memory controller 161 enters low power operation mode. However if last operation was not a scrub operation, then at step 440, memory controller 161 initiates idle timer process. During the idle timer process, at decision 450, if the memory queue is idle, at decision 460 memory controller 161 detects if the idle timer of the idle timer process has expired. If the idle timer has expired, memory controller 161 enters low power mode at step 430. However, if the idle timer has not expired, memory controller 161 continues to detect if the memory queue is idle.

Figure 5:
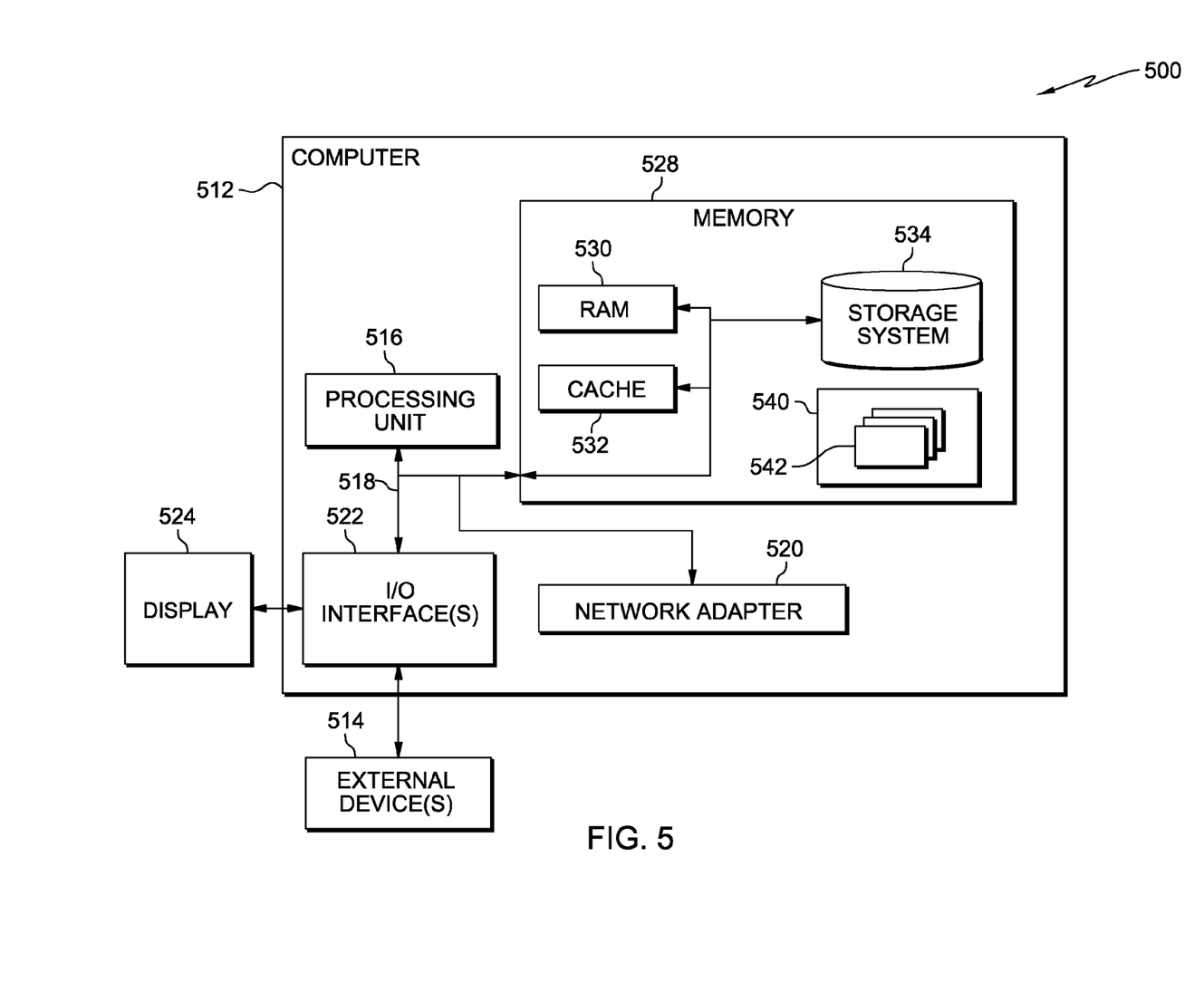
FIG. 5 illustrates a block diagram of components of a computer system in accordance with embodiments of the present invention.

FIG. 5 is a functional block diagram of a computer system, in accordance with an embodiment of the present invention.

Computer system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computing system 100 can be implemented as an instance of computer 512. Computer 512 may be described in the general context of computer system executable instructions, such as program modules, being executed by a computer system. Generally, program modules may include routines, programs, objects, components, logic, data structures, and so on that perform particular tasks or implement particular abstract data types.

Computer 512 may operated in a distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 is shown in the form of a general-purpose computing device. The components of computer 512 may include, but are not limited to, one or more processors or processing units 516, memory 528, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 includes computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Memory controller 161 can be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Each one memory controller 161 can be implemented as an instance of program 540.

Computer 512 may also communicate with one or more external devices 514 such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication occurs via Input/Output (I/O) interfaces 522. Still yet, computer 512 communicates with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product method for saving power in a memory subsystem that uses memory access idle timer to enable low power mode and memory scrub operation of a memory scrub engine within the memory subsystem of a computing system have been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. Therefore, the present invention has been disclosed by way of example and not limitation.

What is claimed is:

1. A computing system for saving power in a memory subsystem that uses memory access idle timer to enable low power mode and memory scrub operation of a memory scrub engine within the memory subsystem of the computing system, the computing system comprising:
    one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
    program instructions to determine that the memory subsystem is switched out of low power mode due to a memory scrub operation; and
    program instructions to bypass an idle timer of the memory subsystem such that the memory subsystem is returned to the low power mode upon completion of the memory scrub operation, wherein the computing system bypasses the low power mode of the idle timer, if the only reason the computing system transitioned to non-idle mode is to perform background scrubbing of memory of the computing system, and wherein, the memory controller of memory maintains a the scrub flag that it clears every time a new non-scrub operation is performed into memory operations queue of the computing system.

2. The computing system according to claim 1, wherein the computing system sets a scrub flag of the memory subsystem to a high state if the memory subsystem is in low power mode and the memory subsystem performs the memory scrub operation, and wherein the computing system clears the scrub flag to a low state if the memory subsystem performs an operation that is not the memory scrub operation.

3. The computing system according to claim 2, wherein the computing system bypasses the low power mode of an idle timer if the memory subsystem is idle and the scrub flag is set to the high state.

4. The computing system according to claim 2, wherein the computing system starts the idle timer and waits for expiration of the idle timer before entering low power mode, if the memory subsystem is idle and the scrub flag is clear to the low state.

5. The computing system of claim 2, further comprising: program instructions to start the idle timer and waits for expiration of the idle timer before entering the low power operation mode, if the memory subsystem is idle and the scrub flag is clear to the low state.

6. The computing system according to claim 1, wherein the memory subsystem includes a monitoring circuit that detects when the memory subsystem is idle, and wherein the memory subsystem is idle if there are no operations in one or more memory locations of the memory subsystem.

7. The computing system according to claim 1, wherein the memory scrub operation is performed by a memory engine of the memory subsystem.

8. A computer program product for saving power in a memory subsystem that uses memory access idle timer to enable low power mode and memory scrub operation of a memory scrub engine within the memory subsystem of a computing system, the computer program product comprising:
    one or more computer-readable tangible storage devices and program instructions stored on at least one of the one or more storage devices, the program instructions comprising:
    program instructions to determine that the memory subsystem is switched out of low power mode due to a memory scrub operation; and
    program instructions to bypass an idle timer of the memory subsystem such that the memory subsystem is returned to the low power mode upon completion of the memory scrub operation, wherein the computing system bypasses the low power mode of the idle timer, if the only reason the computing system transitioned to non-idle mode is to perform background scrubbing of memory of the computing system, and wherein, the memory controller of memory maintains a the scrub flag that it clears every time a new non-scrub operation is performed into memory operations queue of the computing system.

9. The computer program product according to claim 8 wherein the computing system sets a scrub flag of the memory subsystem to a high state if the memory subsystem is in low power mode and the memory subsystem performs the memory scrub operation, and wherein the computing system clears the scrub flag to a low state if the memory subsystem performs an operation that is not the memory scrub operation.

10. The computer program product according to claim 9, wherein the computing system bypasses the low power mode of an idle timer if the memory subsystem is idle and the scrub flag is set to the high state.

11. The computing program product according to claim 9, wherein the memory subsystem includes a monitoring circuit that detects when the memory subsystem is idle, and wherein the memory subsystem is idle if there are no operations in one or more memory locations of the memory subsystem.

12. The computer program product according to claim 9, wherein the memory scrub operation is performed by a memory engine of the memory subsystem.

* * * * *